(12) United States Patent
Talagala et al.

(10) Patent No.: US 8,397,016 B2
(45) Date of Patent: Mar. 12, 2013

(54) EFFICIENT USE OF HYBRID MEDIA IN CACHE ARCHITECTURES

(75) Inventors: Nisha Talagala, Livermore, CA (US); Berry Kercheval, Palo Alto, CA (US); Martin Patterson, Menlo Park, CA (US); Edward Pernicka, Palo Alto, CA (US); James Bowen, Santa Clara, CA (US)

(73) Assignee: Violin Memory, Inc., Mountain View, CA (US)

( * ) Notice: Subject to any disclaimer, the term of this patent is extended or adjusted under 35 U.S.C. 154(b) by 476 days.

(21) Appl. No.: 12/650,966

(22) Filed: Dec. 31, 2009

(65) Prior Publication Data

US 2011/0145479 A1   Jun. 16, 2011

Related U.S. Application Data

(60) Provisional application No. 61/142,046, filed on Dec. 31, 2008.

(51) Int. Cl.
*G06F 12/00* (2006.01)
(52) U.S. Cl. ................. 711/103; 711/E12.008
(58) Field of Classification Search .......... None
See application file for complete search history.

(56) References Cited

U.S. PATENT DOCUMENTS

| | | | |
|---|---|---|---|
| 2005/0235131 A1* | 10/2005 | Ware | 711/203 |
| 2006/0026211 A1* | 2/2006 | Potteiger | 707/200 |
| 2006/0080515 A1 | 4/2006 | Spiers | |
| 2006/0087893 A1 | 4/2006 | Nishihara | |

OTHER PUBLICATIONS

International Search Report for PCT/US2010/060408, dated Aug. 29, 2011, 8 pages.
Written Opinion of the International Searching Authority for International Application No. PCT/US2010/060408, dated Aug. 29, 2011, 3 pages.
International Preliminary Report on Patentability for International Application No. PCT/US2010/060408, dated Jul. 4, 2012, 4 pages.

* cited by examiner

*Primary Examiner* — Edward Dudek, Jr.
*Assistant Examiner* — John P Fishburn
(74) *Attorney, Agent, or Firm* — Brinks Hofer Gilson and Lione

(57) ABSTRACT

A multi-tiered cache manager and methods for managing multi-tiered cache are described. Multi-tiered cache manager causes cached data to be initially stored in the RAM elements and selects portions of the cached data stored in the RAM elements to be moved to the flash elements. Each flash element is organized as a plurality of write blocks having a block size and wherein a predefined maximum number of writes is permitted to each write block. The portions of the cached data may be selected based on a maximum write rate calculated from the maximum number of writes allowed for the flash device and a specified lifetime of the cache system.

6 Claims, 2 Drawing Sheets

EFFICIENT USE OF HYBRID MEDIA IN CACHE ARCHITECTURES

BACKGROUND OF THE INVENTION

1. Field of the Invention

The present invention relates generally to data storage, and more particularly to an architecture and approach for using hybrid media in high performance, highly scaleable storage accelerators for computer networks.

2. Description of Related Art

In computing architectures that use externally attached storage such as Network Attached Storage (NAS) or Storage Area Networks (SANs), there is a growing mismatch between the increasing speed of computer servers and the ability of storage systems to deliver data in a timely fashion. The inability of storage systems to keep pace with fast servers can cause applications to stall and result in overall throughput of the system reaching a plateau or regressing under significant load.

An examination of the root causes of this scalability problem reveals a common factor related to latency of fetching data from spinning magnetic disk drives and more particularly, associated with rotation and seek time. While drives can deliver large contiguous amounts of data with an initial latency of 1-5 ms in seek time (moving the drive heads to the correct location on disk) frequent access to non-contiguous data can be of the order of ~40 ms per access. For datasets that involve a lot of randomly accessed data (such as relational databases), the drive seek time becomes a major bottleneck in delivering data in a timely fashion.

Traditional attempts to solve this problem include adding a hierarchy of RAM-based data caches in the data path. This conventional approach is illustrated in FIG. 1. As shown in FIG. 1, when a compute server 110 attempts to access data from storage system 102 via a network 120, there are typically at least three different caches in the overall data path. A hard drive data cache 108 provides about Mbytes of cache, a storage system cache 106 provides between about 128 Mbytes and 16 Gbytes, and a compute server data cache 112 provides between about 100 M and 2 Gbytes (typical lightly loaded system). While such caches are generally beneficial, certain drawbacks remain. For example, the performance problems mentioned above still occur when the active data set is being accessed randomly or is too large to fit into the caches normally present or when the I/O requirements of the dataset exceed the capabilities of the controller attached to the cache.

There have been a number of attempts to create caching products which try to attack this problem through custom hardware solutions. Examples of this include RAMSAN from Texas Memory Systems (http://www.superssd.com/) and e and n-series products from Solid Data (http://www-.soliddata.com/). These products are inadequate because they rely on solid-state disk technology which tends to be both expensive and limited in maximum storage size.

Flash memory is a non-volatile computer memory than can be erased and reprogrammed. It is offered in various forms ranging from memory cards to SATA based drives. Flash memory has unique characteristics which make using the devices a challenge in enterprise computing environments. Most notably, flash memory supports a limited number of write and/or erase cycles, and exceeding this limit can render the device unusable. Also, the write tolerance of a flash memory can be significantly impacted by the size of the write operations performed. Flash devices were traditionally targeted at storage environments where data was not frequently overwritten. For example, flash memory has been commonly used as a server boot device where the operating system is written once and infrequently updated. Cache appliances on the other hand can encounter frequent media writes, both while serving cache misses (on READS) and while processing application WRITES. Also, unlike persistent storage, the contents of a cache device can turn over frequently. Therefore, flash memory has not been viewed as suitable for use in cache applications.

BRIEF SUMMARY OF THE INVENTION

Certain embodiments of the invention provide methods for managing mixed-media cache. Data is received for caching and assigned into one or more blocks. Data may be optionally moving to flash memory from RAM if it is aged and used infrequently. Data may be selected for storing in flash based on factors including the size and the age of the data. Certain embodiments of the invention may also provide a multi-tiered cache system comprising a plurality of cache elements including RAM and flash elements and a manager configured to control access to the cache elements.

In certain embodiments, a multi-tiered cache manager causes cached data to be initially stored in the RAM elements and selects portions of the cached data stored in the RAM elements to be moved to the flash elements. Each flash element is organized as a plurality of write blocks having a block size and wherein a predefined maximum number of writes is permitted to each write block. The portions of the cached data may be selected based on a maximum write rate calculated from the maximum number of writes and a specified lifetime of the cache system. Each of the portions of the cached data may be moved to a designated write block and the portions of the cached data are substantially equal in size to the size of the designated write block. Each RAM element can be organized as a plurality of RAM blocks and portions of the cached data can be moved to flash when no RAM block is available for storing new data.

DETAILED DESCRIPTION OF THE INVENTION

Embodiments of the present invention will now be described in detail with reference to the drawings, which are provided as illustrative examples so as to enable those skilled in the art to practice the invention. Notably, the figures and examples below are not meant to limit the scope of the present invention to a single embodiment, but other embodiments are possible by way of interchange of some or all of the described or illustrated elements. Wherever convenient, the same reference numbers will be used throughout the drawings to refer to same or like parts. Where certain elements of these embodiments can be partially or fully implemented using known components, only those portions of such known components that are necessary for an understanding of the present invention will be described, and detailed descriptions of other portions of such known components will be omitted so as not to obscure the invention. In the present specification, an embodiment showing a singular component should not be considered limiting; rather, the invention is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the components referred to herein by way of illustration.

Certain embodiments of the invention provide systems and methods that can efficiently implement cache architectures, appliances and applications using hybrid media. RAM based clustered cache appliances such as those described in U.S. patent application Ser. No. 11/365,474 ("Method and Apparatus for Providing High-Performance and Highly-Scalable Storage Acceleration," which is incorporated herein by reference in its entirety) can be used with certain extensions to obtain storage acceleration. Such appliances can intercept requests between applications and their storage devices and can cache data to improve performance. Certain aspects of the presently described application extend the application and utility of various caching architectures by enabling the use a variety of forms of media including flash based devices.

Figure 1:
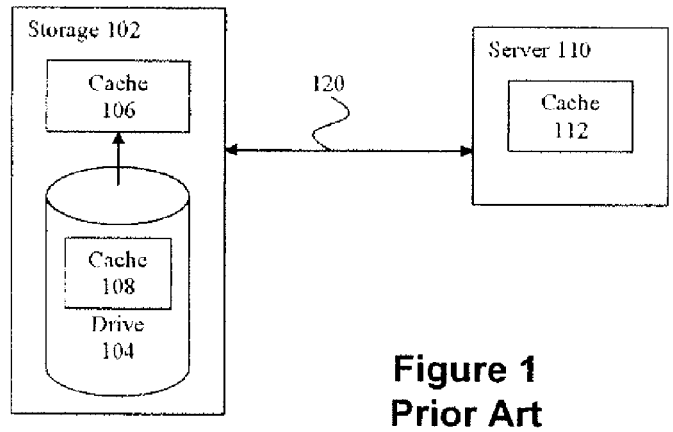
FIG. 1 illustrates a conventional approach to cache management.
Figure 2:
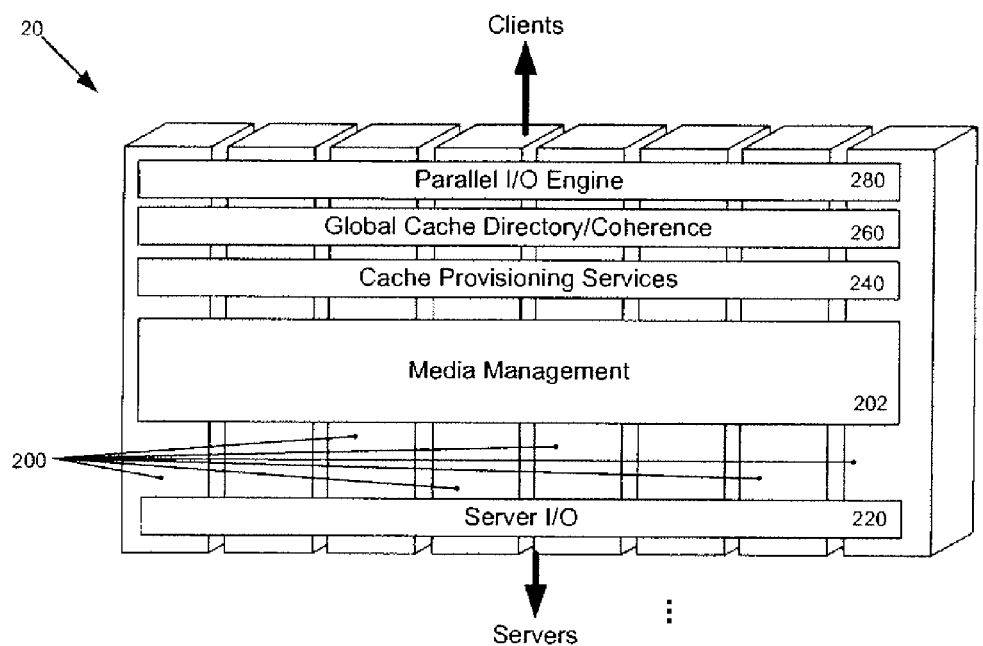
FIG. 2 is a general depiction of a cache management system 20 according to certain aspects of the invention.

FIG. 2 is a general depiction of a cache management system 20 according to certain aspects of the invention. Cache elements 200, comprising RAM and flash devices are controlled and managed by a media manager 202. Media manager 202 typically identifies and configures cache elements 200 and manages access to the elements 200. For example, media manager 202 may determine that one of cache elements 200 is a flash device having a minimum block size for writing; accordingly, media manager 202 may set access controls for the element that delays writing until a substantially full block of flash has been accumulated or aggregated. Cache provisioning services 240 allocates cache upon system request and interacts with media management 202 to identify cache types, availability, etc. Cache directory services 260 and I/O 220 and 280 interface with system, servers and clients.

Figure 3:
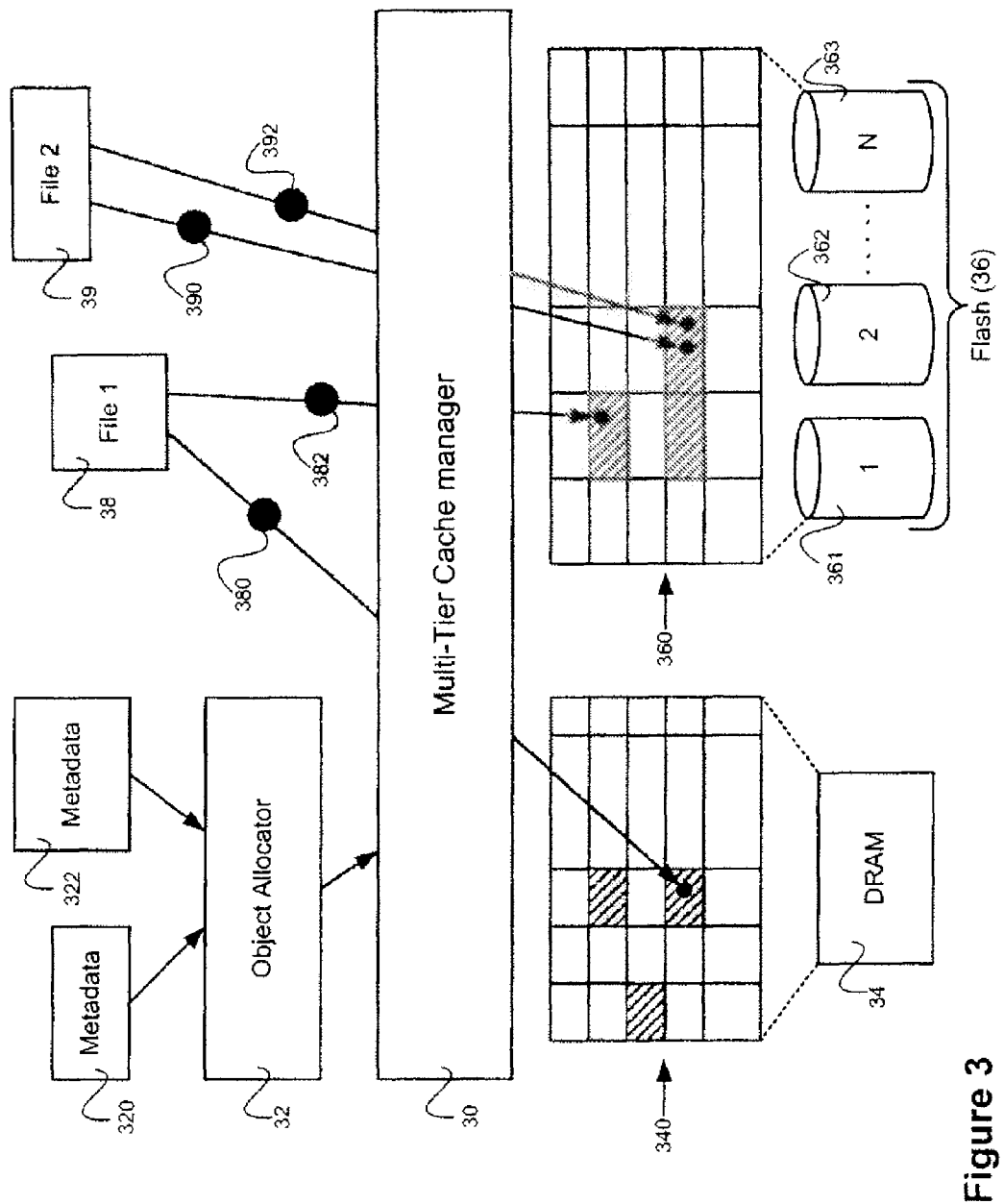
FIG. 3 illustrates operation of a simplified cache manager according to certain aspects of the invention.

Certain embodiments of the invention employ a plurality of optimizations to permit use of flash in a cache appliance. A two tier (or hybrid) cache architecture may be provided to permit the use of flash media in a cache appliance. In the simplified example depicted in FIG. 3, cache manager 30 manages two forms of media, RAM 34 and flash 36. Each media space 340 and 360 is typically mapped as a collection of blocks. Block sizes for RAM space 340 and flash space 360 need not be the same and the block size for the flash cache space 360 may be selected to deliver maximum WRITE tolerance. For example, the optimal WRITE block size for current flash drives can range between 128 KB to several megabytes, depending on the manufacturer. The block size for RAM space 340, on the other hand, is typically selected to obtain optimal storage efficiency. In one example where the cache is storing many small files less than 1 Kbyte, the optimal block size for the RAM space 340 could be 1 KB. If the larger files are being stored, the optimal block size could be 4 KB or larger. In certain embodiments, multiple flash devices 361-363 are used and the block size of each flash device 361-363 can be set independently to match the ideal I/O size for that device.

Data may be stored in the hybrid cache following a READ cache miss or a WRITE operation and in certain other circumstances. Typically the data is first stored in RAM based cache space 340. Subsequent cache operations and requests are serviced from RAM until the RAM based cache space 340 becomes full. When RAM based cache space 340 is filled, a selection of blocks can be chosen to be de-staged into the flash media 36. Alternately, the cache may free certain blocks directly from RAM 34 and may de-stage to flash 36. A collection of RAM blocks can be selected to fill up one flash block based on factors including relative block sizes of the RAM space 340 and flash space 360. For example, if the blocks in RAM space 340 are 4 Kbytes in size and the blocks in Flash space 360 are sized at 128 Kbytes, then 32 RAM blocks may be accumulated to make up one flash block. To ensure maximum lifetime of the flash media 36, WRITE operations to flash media 36 can be restricted to units of the optimal block size.

In addition to controlling the size of WRITE operations to the flash media 36, the hybrid cache can also control the number and rate of WRITE operations to the flash media 36. This can be accomplished in various ways. One simple technique comprises limiting the total number of WRITEs permitted in a given window of time to a selected, often fixed, number. Another technique comprises remembering the total number of WRITEs to the flash media 36 performed during the lifetime of flash media 36; the WRITE rate can be increased or decreased as necessary to maximize efficiency and to meet specified/guaranteed lifetime of flash media 36. Controlling the WRITE rate of the flash media 36 may be determinative of whether a WRITE can be performed at any given time. A de-staging operation will typically not be performed unless the write rate can be maintained within specification. Consequently, a miss operation may not populate cache and/or certain data may be evicted from cache. Evicted data can be brought into the cache later and/or as needed during a miss operation. Since the number of WRITE cycles of a flash drive 36 also varies with manufacturer, with type of flash used and sometimes with generation of flash and/or drive 36, the WRITE rate can be configured for different types of flash used in the cache and can be individually set for each type flash drive 361-363 in the drive 36.

Hybrid cache can maintain internal data structures that map cached blocks of files to either the RAM space 340 or the flash space 360. Files need not be stored entirely in RAM 34 or entirely in flash 36. For example, different blocks 380 and 382 from file 38 can be stored in both RAM space 340 and flash space 360. Internal data structures relating blocks 380 and 382 with their origin in file 38 can be maintained in the RAM space 340 and can optionally be backed up onto the flash media 36. Likewise, blocks 390 and 392 from file 39 may be stored in the same device (here flash 36), and relationships of the blocks 390 and 392 may be maintained by cache manager 30 in RAM space 340 and/or flash space 360.

Plural flash based memory units or flash based disk drives 361-363 can be used to make up the flash cache space 360. Flash WRITE block size can be optimized for writes even to different devices 361-363. The rate of WRITES, however, is typically managed to ensure that the write capability of all available flash devices is utilized. In other words, WRITE operations can be optimally divided across all available units of the media according to individual WRITE rates and/or system level WRITE rates.

READ operations that hit in the RAM cache media 34 can be served directly from RAM space 340. READ operations that hit in the flash media 36 and READ operations that hit partly in flash 36 and partly in RAM 34 can be handled in various ways. Each portion of the content can be served from its resident media 34 or 36 and, optionally, the content in flash space 360 can be staged to RAM space 340. READS from the flash media are typically permitted to occur at any block size and do not have to occur in unit sizes set for the optimal WRITE block size.

In certain embodiments, a hybrid cache system provides methods for selecting data to be transferred from RAM space 340 to flash space 360. The decision on which blocks of data to store in flash may be based on factors that include: age of data, wherein the age of the data is defined by the date the data is stored to cache or the time of last update of the data in cache; frequency of access and/or frequency of use of the data in; and, frequency of writing to the data.

For example, a good candidate for storage to flash 36 would be data that is aged and frequently accessed; i.e. the data is in demand for read access for long periods of time. However, files that include sections of data that frequently accessed and frequently written may be split between RAM 34 and flash 36 sections of caches such that portions that are rarely written can be cached in flash 36. Candidates for removal from DRAM 34 includes infrequently used aged data. In certain embodiments, such data may be stored in flash 36. Typically frequently accessed, frequently written data is typically cached in RAM 34 and is a candidate for purging. It will be appreciated that user-defined rules may be determinative of the disposition of data in RAM 34 when new data is to be cached. In that regard, a set of priorities may be associated with various data types, data sources, applications associated with the data and/or physical location of the servers and applications using the data.

The location of a particular data block, whether in DRAM 34 or flash 36 can be hidden from other components of the system through a block virtualization layer. The block virtualization layer maps virtual blocks of a certain size to physical blocks that can be located either in DRAM 34 or in flash 36. Other system components need not be aware of the actual location of a block. As needs arise, for example if the DRAM runs out of space, blocks can be transparently migrated from DRAM 34 to flash 36, without affecting any other system components which refer to the block by its virtual address. Blocks can also be transparently compressed in either DRAM 34 or flash 36.

Cache objects that are smaller in size that a physical block can be stored on flash media 36 with the assistance of a memory allocator 32. A memory allocator 32 consumes fixed size (virtual or physical blocks) and divides them up into smaller size units for consumption by the rest of the system. For example, 1K block can be divided up by an allocator 32 into units of 128 bytes, 256 bytes, or smaller units. Any suitable known implementations of allocators known to the skilled artisan can be adapted for use in accordance with certain aspects of the invention. For example, certain library implementations of "malloc" may be used as can other publicly available components such as the Slab Allocator (http://citeseer.ist.psu.edu/bonwick94slab.html).

The hybrid cache as described above is implemented within a single node of the cluster cache architecture. All the cluster based techniques of the previous patent still apply. In addition, the hybrid cache architecture can be used in a single node form, without the addition of any cluster technologies.

Additional Descriptions of Certain Aspects of the Invention

Certain embodiments of the invention provide methods for managing mixed-media cache. Some of these embodiments comprise receiving data for caching, assigning the received data into one or more blocks, optionally moving aged data stored in a RAM block to flash memory and storing the one or more blocks in RAM, wherein moving the data stored in the RAM block includes selecting the RAM block based on factors including the size of the one or more blocks and the age of the moved data. Certain embodiments of the invention may also provide a multi-tiered cache system. Some of these embodiments comprise a plurality of cache elements including RAM and flash elements and a manager configured to control access to the cache elements.

In some of these embodiments, the manager causes cached data to be initially stored in the RAM elements and selects portions of the cached data stored in the RAM elements to be moved to the flash elements. In some of these embodiments, each flash element is organized as a plurality of write blocks having a block size. In some of these embodiments, a predefined maximum number of writes is permitted for each write block. In some of these embodiments, the portions of the cached data are selected based on a maximum write rate calculated from the maximum number of writes and a specified lifetime of the cache system. In some of these embodiments, each of the portions of the cached data is moved to a designated write block and the portions of the cached data are substantially equal in size to the size of the designated write block. In some of these embodiments, each RAM element is organized as a plurality of RAM blocks. In some of these embodiments, each of the portions of the cached data is moved when no RAM block is available for storing new data. In some of these embodiments, RAM blocks are unavailable when they contain cached data. In some of these embodiments, no RAM block is available when no available RAM block is large enough to store new cached data.

Although the present invention has been described with reference to specific exemplary embodiments, it will be evident to one of ordinary skill in the art that various modifications and changes may be made to these embodiments without departing from the broader spirit and scope of the invention. Accordingly, the specification and drawings are to be regarded in an illustrative rather than a restrictive sense.

What is claimed is:

1. A multi-tiered cache system, comprising:
a plurality of cache elements including RAM and flash elements; and
a manager configured to control access to the cache elements,
wherein the manager causes cached data to be initially stored in the RAM elements and selects portions of the cached data stored in the RAM elements to be written to the flash elements based on at least a maximum write rate calculated from the maximum number of writes associated with the flash elements and a specified lifetime of the cache system,
wherein each RAM element is organized as a plurality of RAM blocks, and
wherein each of the portions of the cached data is moved when no RAM block is available for storing new data, and
wherein no RAM block is available when no available RAM block is large enough to store new cached data.

2. The system of claim 1, wherein each flash element is organized as a plurality of write blocks having a block size and wherein a predefined maximum number of writes is permitted for each write block.

3. The system of claim 1, wherein each of the portions of the cached data is moved to a designated write block and the portions of the cached data are substantially equal in size to the size of the designated write block.

4. The system of claim 1, wherein each RAM element is organized as a plurality of RAM blocks and wherein each of the portions of the cached data is moved when no RAM block is available for storing new data.

5. The system of claim 4, wherein RAM blocks are unavailable that contain cached data.

6. A method for managing mixed-media cache system, comprising:
   receiving data for caching;
   assigning the received data into one or more blocks;
   optionally writing aged data stored in a RAM block to flash memory; and
   storing the one or more blocks in RAM, wherein moving the aged data stored in the RAM block includes selecting the RAM block based on factors including the size of the one or more blocks and the age of the moved data, with a maximum write rate calculated from a maximum number of writes associated with flash memory elements and a specified lifetime of the cache system,
   wherein each of the portions of the cached data is moved when no RAM block is available for storing new data, and
   wherein no RAM block is available when no available RAM block is large enough to store new cached data.

* * * * *